June 11, 1957
G. W. MILLER
2,795,711
POWER TRANSMISSION
Filed Aug. 27, 1951
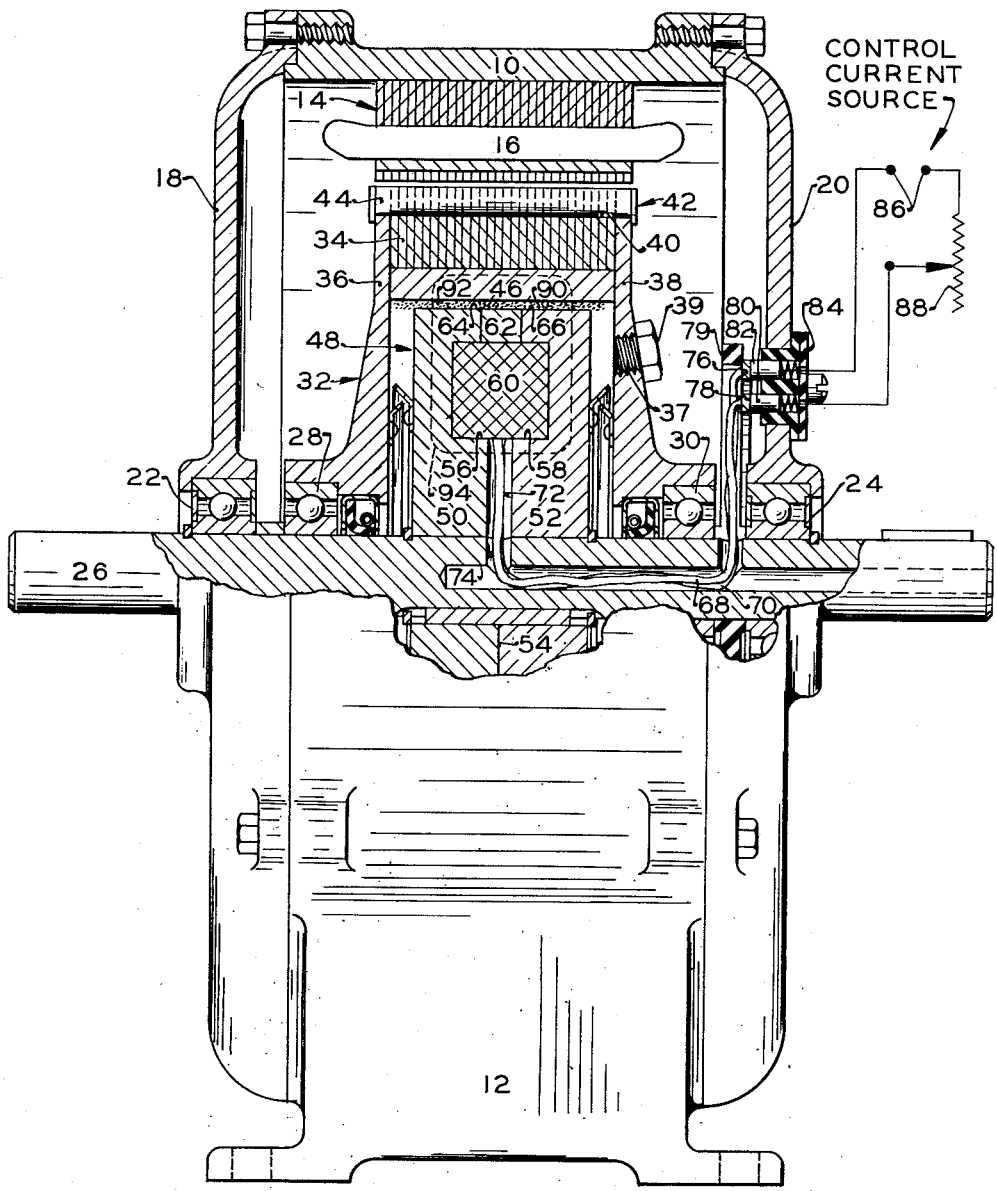
INVENTOR.
GRAY W. MILLER
BY
*Ralph L. Tweedale*
ATTORNEY _United States Patent Office_

2,795,711
Patented June 11, 1957

2,795,711
POWER TRANSMISSION

Gray W. Miller, Webster Groves, Mo., assignor to Vickers Incorporated, Detroit, Mich., a corporation of Michigan Application August 27, 1951, Serial No. 243,847

12 Claims. (Cl. 310—78)

This invention relates to power transmission, and more particularly to electric motors and clutches.

In many applications electric motors transmit power to driven devices through electrically controlled slip couplings or clutches, such as magnetic particle clutches. Usually the clutch is hung outside the motor casing between the motor shaft and the shaft of the driven device. Where space factor is not a serious problem such a physical assembly, although necessarily bulky, is tolerated. However, there are many instances, for example in ships and aircraft, where it is most desirable and necessary to practice space economy in apparatus installations.

In accordance with one embodiment of the present invention, electrodynamic elements are carried by a stator and a hollow rotor, for cooperatively providing electrodynamic action, such as motor action, generator action, etc., the hollow rotor having within it a magnetic particle torque transmitting coupling, for example a clutch, thus providing a structure, such as a motor and clutch unit, which is shorter and far more compact than conventional motor and clutch units.

It is therefore an object of this invention to provide a novel, compact electrodynamic machine and magnetic particle torque transmitting unit.

A further object of the invention is to provide a compact motor and magnetic particle clutch unit.

Further objects and advantages of the present invention will be apparent from the following description, reference being had to the accompanying drawing wherein a preferred form of the present invention is clearly shown.

In the drawing the single figure is an axial cross-section of a preferred embodiment of the invention.

As shown in the drawing, which illustrates a motor and clutch unit, a hollow cylindrical yoke 10 fixed to a base 12 supports along its inner periphery a magnetic stator structure 14 made, for example, of slotted iron laminations and provided with winding elements 16 to form, when electrically energized, a plurality of field poles, preferably of the revolving field type employed in induction motors. A pair of end bells 18 and 20 removably secured to opposite sides of the yoke 10 are provided with centrally located bearings 22 and 24 for an output shaft 26.

Freely rotatable on the shaft by means of bearings 28 and 30 is a hollow rotor 32 which carries a magnetic structure 34 complementary to the stator magnetic structure 14, the two cooperatively forming the magnetic circuit of an electrodynamic machine, which is a motor in the specific embodiment illustrated. The magnetic structure 34, formed, for example, of iron laminations, is a cylindrical shell supported on opposite sides by solid circular plates 36 and 38, preferably made of non-magnetic metal, and mounted on the bearings 28 and 30. An opening 37 with a removable plug 39 may be provided in plate 38 to facilitate the introduction of magnetic particles into the enclosure formed by the rotor parts.

Suitable slots 40 are provided in the magnetic structure 34 for receiving a motor armature winding 42 of the squirrel cage type formed of a plurality of conductive bars 44 connected in parallel by the side plates 36 and 38, or if preferred by separate connecting rings. Thus the magnetic structure 34 serves as a motor armature core. However, the relative location of the field and armature elements may be reversed or transposed in accordance with well known principles.

Within the rotor 32, and secured to rotate therewith, is a coupling element 46 of a magnetic particle clutch in the form of a hollow cylinder and made of suitable magnetic material. A second coupling element, a rotor 48, is located concentrically within the hollow portion of the rotor 32 and is keyed to the shaft 26 to rotate therewith.

The rotor 48 includes a magnetic yoke formed by two discs 50 and 52 made of suitable magnetic material. Central sections of the discs surrounding the shaft 26 abut each other as indicated at 54 to form a low reluctance joint, and annular channels 56 and 58 are formed in the discs to receive a magnetizing coil 60. The discs 50 and 52 are spaced apart from their outer diameter to the channels 56 and 58, and the gap therebetween is sealed by a non-magnetic ring spacer 62 flush with the peripheral surfaces 64 and 66 of the discs, which surfaces are the pole faces of the magnetic yoke. It will be seen from the figure that the cross section of the yoke is generally horseshoe shaped, the "legs" being the spaced sides of the discs 50 and 52. Thus, when the yoke is magnetized upon energization of the coil 60, an infinite number of horseshoe magnets form a volume of revolution around the shaft 26 and set up a toroidal field.

Leads 68 and 70 from the coil 60 are brought out through a small opening 72 at the joint 54 and an axial passage 74 in the shaft 26, and are connected to a pair of slip rings 76 and 78 mounted on an insulating sleeve 79 fixed to rotate with the shaft. A pair of brushes 80 and 82, spring mounted in an insulating brush holder 84, contact the rings 76 and 78 to complete a circuit from a control current source 86 to the coil 60. Adjustment of the control current may be had by means of an adjustable impedance 88.

Coupling action between the clutch elements 46 and 48 is obtained through the medium of magnetic particles 90, for example iron, either lubricated or unlubricated as desired, disposed in the gap 92 between the elements 46 and 48. When the coil 60 is energized by current, a magnetic field is established across the gap 92, the magnetic path being indicated by the dotted lines 94 which traverse the air gap 92 through the magnetic particles 90. The magnetic particles become magnetized when the field is established across the air gap, and the magnetized particles bind the clutch elements together to an extent dependent on the strength of the field and load. Operative ranges from substantially 100% slip to zero slip (synchronous operation) between the coupling elements is available through control of the magnetic excitation.

When current is supplied to the field windings 16, motor action rotates the rotor 32 including the clutch element 46. The output shaft 26 will remain idle until a magnetic field is set up across the gap 92 which in the particular embodiment shown is brought about by supplying energizing current to coil 60. Once such a field is set up the magnetic particles 90 as hereinbefore explained will form a torque transmitting bond between the coupling members 46 and 48 and rotation will be transmitted from the rotor to the output shaft 26, with or without slip, depending on the strength of the exciting field set up by the coil 60 which in turn is dependent upon the magnitude of the exciting current supplied to the coil.

In some modifications the magnetic portions 34 and 46 of the rotor 32 can be a single magnetic structure common to the motor and to the clutch, the outer portion carrying motor windings and the inner portion serving as a clutch element. Such a common magnetic rotor structure would normally be solid where both the motor and clutch are direct current energized, and laminated where both motor and clutch are alternating current energized.

Since the magnetic flux path of the motor is at right angles or in quadrature with the flux path of the clutch in the particular embodiment shown, there is no appreciable interaction between the motor and clutch magnetic circuit. However, in modifications where the motor and clutch fields might be parallel to each other, undesirable interaction is prevented by making the magnetic circuit elements of generous proportions. Another way to cut down interaction is to separate the motor and clutch magnetic elements in the rotor by a magnetic shield or by a non-magnetic spacer. The latter would be more appropriate where both the motor and clutch are direct current energized.

It will be appreciated that the invention can be utilized in the reverse order, that is, the shaft 26 can be used as a power input shaft coupled to an external prime mover so that the members 48 and 46 become the driving and driven members, respectively, and the stator, together with outer rotor elements will cooperate as an electric generator rather than a motor.

Although an induction motor is shown, the invention is not limited to such, as other types of electric motors may be employed. The same is true of the magnetic particle torque transmitting or coupling elements which may have a magnetic circuit excited either by unidirectional or alternating magnetic fields.

The invention is best adaptable in connection with motors or generators having two or more pairs of poles. A machine having one pair of poles has the least amount of "waste space" in the rotor. As the number of pairs of poles increases more room is available within the rotor, and larger clutch units may be contained within the rotor.

While the form of embodiment of the invention as herein disclosed constitutes a preferred form, it is to be understood that other forms might be adopted, all coming within the scope of the claims which follow.

What is claimed is as follows:

1. A power transmission apparatus comprising three relatively rotatable members, said members being coaxial and in telescoped relation, two of said members having means including electrodynamically cooperating elements and a magnetic circuit for converting energy of one form applied to one of said two members into energy of another form in the other of said two members, another two of said members having a magnetic circuit including cooperating magnetic field responsive torque transmitting elements defining a magnetic gap, said magnetic circuits being in quadrature, and magnetic particles in said gap.

2. A power transmission apparatus comprising three concentric relatively rotatable members, two of said members having means including electrodynamically cooperating elements and a magnetic circuit for converting energy of one form applied to one of said two members into energy of another form in the other of said two members, another two of said members having a magnetic circuit including cooperating magnetic field responsive torque transmitting elements separated by a gap, said magnetic circuits being in quadrature, and magnetic particles in said gap.

3. A power transmission apparatus comprising an electrodynamic magnetic circuit comprising a stator and a first rotor, a clutch magnetic circuit comprising the first rotor and a second rotor and magnetic particles therebetween, said magnetic circuits being in quadrature and said rotors being relatively rotatable, said stator and rotors being concentric and in telescoped relation.

4. A power transmission apparatus comprising a stator and a first rotor forming a magnetic circuit for electrodynamic action, a second rotor within the first rotor, magnetic particles between said rotors, a second magnetic circuit formed by both rotors, and means including said second magnetic circuit and said magnetic particles for creating a torque transmitting bond between said rotors, the magnetic fluxes in both magnetic circuits being in quadrature, said stator and rotors being concentric and in telescoped relation.

5. A power transmission apparatus comprising a pair of relatively rotatable rotors forming a first magnetic circuit, a stator forming a second magnetic circuit with one of said rotors for electrodynamic action, and magnetic means including magnetic particles and said first magnetic circuit for creating a torque transmitting bond between said rotors, the magnetic fluxes of both magnetic circuits being in quadrature with each other through said one rotor, said stator and rotors being concentric and in telescoped relation.

6. A power transmission apparatus comprising a clutch rotor, a motor rotor around said clutch rotor and relatively rotatable with respect thereto, a motor magnetic circuit, including a stator and said motor rotor to produce motor action, and magnetic means including a magnetic circuit in quadrature with the motor magnetic circuit for creating a torque transmitting bond between said rotors, said means comprising magnetic surfaces on said rotors defining a gap therebetween, magnetic particles within said gap and magnetizing means for exciting said particles to form a torque transmitting bond between said rotors, said stator and rotors being concentric and in telescoped relation.

7. A power transmission apparatus comprising a hollow stator member, a rotor member within the stator member, said members being concentric and carrying cooperating electrodynamic elements forming a magnetic circuit for producing electrodynamic action, said rotor member comprising a pair of spaced generally circular nonmagnetic plates, a hollow open-ended cylindrical magnetic clutch element secured to and between said plates, said plates substantially closing the open ends of said clutch element, and being of greater diameter than said clutch element, one of said electrodynamic elements being secured to and between said plates in the marginal space between the outer periphery of said clutch element and the peripheries of said plates, a second clutch element located between said plates and within said first clutch element and being rotatable with respect to said rotor member, and means for creating a torque transmitting bond between said clutch elements, said means comprising magnetic particles and magnetizing means for exciting said particles, said last means comprising a magnetic circuit and a clutch winding on one of said clutch elements, said magnetic circuits being in quadrature, slip ring means connected to said winding and carried by the clutch element with the clutch winding, and brush means in contact with said slip ring means and carried by and extending into said hollow housing.

8. A power transmission apparatus comprising a hollow stator member, a rotor member within the stator member, said members being concentric and carrying cooperating electrodynamic elements forming a magnetic circuit for producing electrodynamic action, said rotor member comprising a pair of spaced generally circular metallic nonmagnetic plates, a hollow open-ended cylindrical magnetic clutch element secured to and between said plates, said plates substantially closing the open ends of said clutch element and being of greater diameter than said clutch element, one of said electrodynamic elements being secured to and between said plates in the marginal space between the outer periphery of said clutch element and the peripheries of said plates, said last electrodynamic element having winding elements connected in circuit with each other by said plates, a second clutch element located between said plates and within said first clutch element and being rotatable with respect to said rotor member, and means for creating a torque transmitting bond between said clutch elements, said means comprising magnetic particles and magnetizing means for exciting said particles, said last means comprising a magnetic circuit and a clutch winding on one of said clutch elements, said magnetic circuits being in quadrature, slip ring means connected to said clutch winding and carried by the clutch element with the clutch winding, and brush means in contact with said slip ring means and carried by and extending into said hollow stator member.

9. A power transmission apparatus comprising first, second and third relatively rotatable members, said members being coaxial and in telescoped relation, said second member being radially disposed between the first and third members, said second member having a laminated magnetic portion and a cylindrical nonlaminate magnetic portion, said first member having magnetic means cooperating with said laminated portion to form a first magnetic circuit for electrodynamic action, said laminated portion lying radially intermediate the first member and said nonlaminate portion, means including said third member and said nonlaminate portion forming a second magnetic circuit, said third member and said nonlaminate portion being spaced to define a gap therebetween, said nonlaminate portion lying radially between said laminated portion and said third member, and means for forming a torque transmitting bond between said nonlaminate portion and said third member, the latter means including magnetic particles in said gap, said second magnetic circuit, and means for magnetizing the second magnetic circuit to excite said particles.

10. A power transmission apparatus comprising first, second and third relatively rotatable members, said members being coaxial and in telescoped relation, said second member being radially disposed between the first and third members, said second member having a laminated magnetic portion and a cylindrical nonlaminate magnetic portion, said first member having magnetic means cooperating with said laminated portion to form a first magnetic circuit for electrodynamic action, said laminated portion lying radially intermediate the first member and said nonlaminate portion, means including said third member and said nonlaminate portion forming a second magnetic circuit, said third member and said nonlaminate portion being spaced to define a gap therebetween, said nonlaminate portion lying radially between said laminated portion and said third member, and means for forming a torque transmitting bond between said nonlaminate portion and said third member, the latter means including magnetic particles in said gap, said second magnetic circuit, and means independent of said electrodynamic action for magnetizing the second magnetic circuit to excite said particles.

11. A power transmission apparatus comprising first, second and third relatively rotatable members, said members being coaxial and in telescoped relation, said second member being radially disposed between the first and third members, said second member having a laminated magnetic portion and a cylindrical nonlaminate magnetic portion, said first member having magnetic means cooperating with said laminated portion to form a first magnetic circuit for electrodynamic action, means including said third member and said nonlaminate portion forming a second magnetic circuit, said third member and said nonlaminate portion being spaced to define a gap therebetween, the first member, the laminated portion, the nonlaminate portion, and the third member being concentrically related, with the laminated portion disposed between the first member and the nonlaminate portion, and the nonlaminate portion disposed between the laminated portion and the third member, means for forming a torque transmitting bond between the nonlaminate portion and the third member, the latter means including magnetic particles in said gap, said second magnetic circuit, and means for magnetizing the second magnetic circuit and thereby said particles, and means for preventing interaction between said magnetic circuits.

12. A power transmission apparatus comprising first, second and third relatively rotatable members, said members being coaxial and in telescoped relation, said second member being radially disposed between the first and third members, said second member having a laminated magnetic portion and a cylindrical nonlaminate magnetic portion, said first member having magnetic means cooperating with said laminated portion to form a first magnetic circuit for electrodynamic action, means including said third member and said nonlaminate portion forming a second magnetic circuit, said third member and said nonlaminate portion being spaced to define a gap therebetween, the first member, the laminated portion, the nonlaminate portion, and the third member being concentrically related, with the laminated portion disposed between the first member and the nonlaminate portion, and the nonlaminate portion disposed between the laminated portion and the third member, means for forming a torque transmitting bond between the nonlaminate portion and the third member, the latter means including magnetic particles in said gap, said second magnetic circuit, and means independent of said electrodynamic action for magnetizing the second magnetic circuit and thereby said particles, and means for preventing interaction between said magnetic circuits.

References Cited in the file of this patent

UNITED STATES PATENTS

| | | |
|---|---|---|
| 427,978 | Dobrowolsky | May 13, 1890 |
| 664,190 | Thomson | Dec. 18, 1900 |
| 1,171,948 | Hassler | Feb. 15, 1916 |
| 1,506,753 | Hoey | Sept. 2, 1924 |
| 2,525,571 | Winther | Oct. 10, 1950 |
| 2,575,360 | Rabinow | Nov. 20, 1951 |
| 2,663,809 | Winslow | Dec. 22, 1953 |

OTHER REFERENCES

Technical News Bulletin of the National Bureau of Standards, vol. 34, No. 12, December 1950, page 172.